United States Patent [19]
Adolphi et al.

[11] 3,917,826
[45] Nov. 4, 1975

[54] PESTICIDE USES OF SUBSTITUTED FLUOROPHOSPHAZENES

[75] Inventors: Heinrich Adolphi, Limburgerhof; Gerd Wunsch, Speyer; Volker Kiener, Ludwigshafen, all of Germany

[73] Assignee: BASF Aktiengellschaft, Ludwigshafen (Rhine), Germany

[22] Filed: June 26, 1974

[21] Appl. No.: 483,242

[30] Foreign Application Priority Data
July 7, 1973 Germany............................ 2334714

[52] U.S. Cl. .............................................. 424/204
[51] Int. Cl.² .......................................... A01N 9/36
[58] Field of Search................... 424/200, 204, 209; 260/927 N

[56] References Cited
UNITED STATES PATENTS

| | | | |
|---|---|---|---|
| 3,074,989 | 1/1963 | Ratz | 260/927 N |
| 3,136,754 | 6/1964 | Ottmann et al. | 424/209 |

FOREIGN PATENTS OR APPLICATIONS

| | | |
|---|---|---|
| 1,369,653 | 9/1963 | France |
| 4,113,479 | 4/1965 | Japan |

*Primary Examiner*—Albert T. Meyers
*Assistant Examiner*—D. W. Robinson
*Attorney, Agent, or Firm*—Johnston, Keil, Thompson & Shurtleff

[57] ABSTRACT

New and valuable pesticides containing, as active ingredients, substituted fluorophosphazenes, and a process for controlling pests with these compounds.

8 Claims, No Drawings

PESTICIDE USES OF SUBSTITUTED FLUOROPHOSPHAZENES

This application discloses and claims subject matter described in German patent application Ser. No. P 23 34 714.0, filed July 7, 1973, which is incorporated herein by reference.

The present invention relates to new and valuable pesticides containing, as active ingredients, substituted fluorophosphazenes, and a process for controlling pests with these compounds.

We have found that substituted fluorophosphazenes of the formula $$N_3P_3F_n(XR)_{6-n}$$

where X denotes sulfur or NHCO, R denotes methyl, ethyl or phenyl and n denotes one of the integers 2, 3, 4 and 5, X may additionally denote oxygen, in which case R denotes phenyl or ethyl and n is 5, are excellently suited for controlling pests.

The following compounds are given by way of example:

|  | b.p. mm Hg | °C |
| --- | --- | --- |
| $N_3P_3F_5SCH_3$ | 60 | 56 – 60 |
| $N_3P_3F_5SC_2H_5$ | 0.2 | 47 – 51 |
| $N_3P_3F_4(SC_2H_5)_2$ | 15 | 117 |
| $N_3P_3F_3(SC_2H_5)_3$ | 0.01 | 100 – 104 |
| $N_3P_3F_2(SC_2H_5)_4$ | 0.01 | 111 – 115 |
| $N_3P_3F_5(SC_6H_5)$ | 0.2 | 47 – 48 |
| $N_3P_3F_5OC_6H_5$ | 0.8 | 46 |
| $N_3P_3F_5OC_2H_5$ | 30 | 42 |

The compounds are known from Z. Naturforsch. (E. Niecke, H. Tamm, O. Glemser), 26*b*, 366-7, 1971, and Z. Naturforsch. (E. Niecke, O. Glemser, H. W. Roesky), 24*b*, 1187, 1969. Compounds of the formula

are known from Z. Naturforsch. (H. W. Roesky, E. Janssen), 26*b*, 679 et seq., 1971.

Application may be effected for instance in the form of directly sprayable solutions, powders, suspensions, dispersions, emulsions, oil dispersions, pastes, dusts or granules. The forms of application depend entirely on the purpose for which the agents are being used; in any case they should ensure a fine distribution of the active ingredient.

For the preparation of solutions, emulsions, pastes and oil dispersions to be sprayed direct, mineral oil fractions of medium to high boiling point, such as kerosene or diesel oil, further coaltar oils and oils of vegetable or mineral origin, aliphatic, cyclic and aromatic hydrocarbons such as benzene, toluene, xylene, paraffin, tetrahydronaphthalene, alkylated naphthalenes, methanol, ethanol, propanol, butanol, chloroform, carbon tetrachloride, cyclohexanol, cyclohexanone, chlorobenzene, isophorone, etc., and strongly polar solvents such as dimethylformamide and dimethyl sulfoxide are suitable.

Aqueous formulations may be prepared from emulsion concentrates, pastes, oil dispersions or wettable powders by adding water. To prepare emulsions, pastes and oil dispersions the ingredients as such or dissolved in an oil or solvent may be homogenized in water by means of wetting or dispersing agents, adherents or emulsifiers. Concentrates which are suitable for dilution with water may be prepared from active ingredient, wetting agent, adherent, emulsifying or dispersing agent and possibly solvent or oil.

Examples of surfactants are: alkali metal, alkaline earth metal and ammonium salts of ligninsulfonic acid, naphthalenesulfonic acids, phenolsulfonic acids, alkylaryl sulfonates, alkyl sulfates, and alkyl sulfonates, alkali metal and alkaline earth metal salts of dibutylnaphthalenesulfonic acid, lauryl ether sulfate, fatty alcohol sulfates, alkali metal and alkaline earth metal salts of fatty acids, salts of sulfated hexadecanols, heptadecanols, and octadecanols, salts of sulfated fatty alcohol glycol ether, condensation products of sulfonated naphthalene and naphthalene derivatives with formaldehyde, condensation products of naphthalene or naphthalenesulfonic acids with phenol and formaldehyde, polyoxyethylene octylphenol ethers, ethoxylated isooctylphenol, ethoxylated octylphenol and ethoxylated nonylphenol, alkylphenol polyglycol ethers, tributylphenyl polyglycol ethers, alkylaryl polyether alcohols, isotridecyl alcohol, fatty alcohol ethylene oxide condensates, ethoxylated castor oil, polyoxyethylene alkyl ethers, ethoxylated polyoxypropylene, lauryl alcohol polyglycol ether acetal, sorbitol esters, lignin, sulfite waste liquors and methyl cellulose.

Powders, dusts and broadcasting agents may be prepared by mixing or grinding the active ingredients with a solid carrier.

Granules, e.g. coated, impregnated or homogeneous granules, may be prepared by bonding the active ingredients to solid carriers. Examples of solid carriers are mineral earths such as silica gel, silicic acid, silicates, talc, kaolin, Attaclay, limestone, lime, chalk, bole, loess, clay, dolomite, diatomaceous earth, calcium sulfate, magnesium sulfate, magnesium oxide, ground plastics, fertilizers such as ammonium sulfate, ammonium phosphate, ammonium nitrate, and ureas, and vegetable products such as grain flours, bark meal, wood meal, and nutshell meal, cellulosic powders, etc.

The formulations contain from 0.1 to 95, and preferably from 0.5 to 90, % by weight of active ingredient.

There may be added to the compositions or individual active ingredients (if desired, immediately before use) oils of various types, herbicides, fungicides, nematocides, insecticides, bactericides and trace elements.

These agents may be added to the agents of the invention in a ratio by weight of from 1:10 to 10:1.

Examples of pests are termites, e.g., Reticulitermes sp., Macrotermes sp., Microtermes sp., and Kalotermes sp.; *ligniperdous* beetles, e.g., *Hylotrupes bajulus* (house longhorn), *Anobium punctatum*, and *Lyctus* sp.; flies, e.g., *Musca domestica, Fannia canicularis, Muscina stabulans*, and *Stomoxys calcitrans;* mosquitoes, e.g., Aedes sp., Culex sp., Anopheles sp., Phlebotomus sp., and Simulium sp.; cockroaches, e.g., Blatta sp., Blattella sp., and Periplaneta; butterflies, e.g., Spodoptera sp., Heliothis sp., Plutella sp., Earias sp., Ephestia sp.; and fresh-water snails, e.g., Planorbis sp. and Australorbis sp. The following active ingredients were used in the experiments:

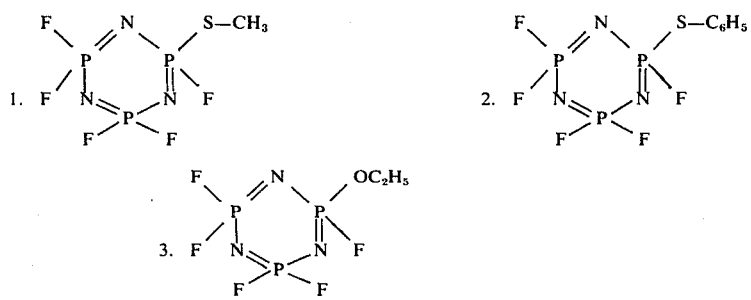

I. Decachlorotetracyclodecanone (comparative agent known from U.S. Pat. No. 2,616,825)

EXAMPLE 1

Active on larvae of the yellow fever mosquito (*Aedes aegypti*)

The experiments were carried out in 100 ml of water on larvae in the 3rd and 4th development stages. The active ingredients were added as aqueous emulsions. The mortality rate was determined after 24 hours.

| Active ingredient | | | Mortality |
| --- | --- | --- | --- |
| I | 5.0 | ppm | ineffective |
| 1 | 0.5 | ppm | 100% |
| 2 | 0.5 | ppm | 100% |
|   | 0.25 | ppm | 80% |
| 3 | 0.25 | ppm | 100% |
|   | 0.1 | ppm | 80% |

EXAMPLE 2

Contact action and action of ingested food on caterpillars of the cabbage moth (*Plutella maculipennis*)

Young cabbage leaves were dipped for 5 seconds into aqueous emulsions of the active ingredients. After the layer had dried, caterpillars in the 4th and 5th larval stage were placed on the leaves. The action was assessed after 48 hours.

| Active ingredient | Mortality | |
| --- | --- | --- |
| 1 | 0.1% | 90% |
|   | 0.05% | 80% |
| 1 | 0.04% | 100% |
|   | 0.02% | 80% |
| 2 | 0.05% | 100% |
|   | 0.05% | 80% |
| 3 | 0.01% | 100% |
|   | 0.005% | 80% |

EXAMPLE 3

Action on fresh-water snails (Planorbis)

Aqueous emulsions of the active ingredients were added to 100 ml of water. Adult snails were used. The action was assessed after 48 hours.

| Active ingredient | | | Mortality |
| --- | --- | --- | --- |
| I | 1.0 | ppm | 100% |
|   | 0.5 | ppm | 20% |
| 1 | 0.05 | ppm | 100% |
| 2 | 0.05 | ppm | 80% |
| 3 | 0.05 | ppm | 100% |
|   | 0.025 | ppm | 80% |

We claim:

1. A process for killing insects which comprises contacting the insects with an insecticidally effective amount of a substituted fluorophosphazene of the formula $$N_3P_3F_n(XR)_{6-n}$$

where X denotes sulfur, in which case R denotes methyl, ethyl or phenyl and n denotes 2, 3, 4 or 5, or X denotes oxygen, in which case R denotes phenyl or ethyl and $n$ is 5.

2. A process for killing insects which comprises contacting the insects with an insecticidally effective amount of the compound

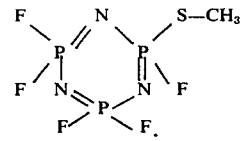

3. A process for killing insects which comprises contacting the insects with an insecticidally effective amount of the compound

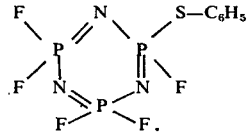

4. A process for killing insects which comprises contacting the insects with an insecticidally effective amount of the compound

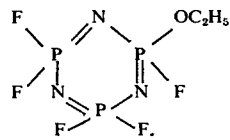

5. A process for killing fresh water snails which comprises contacting said snails with a toxically effective amount of a substituted fluorophosphazene of the formula

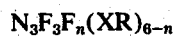

where X denotes sulfur, in which case R denotes methyl, ethyl or phenyl and n denotes 2, 3, 4 or 5, or X denotes oxygen, in which case R denotes phenyl or ethyl and n is 5.

6. A process as claimed in claim 5 wherein said substituted fluorophosphazene is the compound

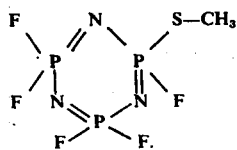

7. A process as claimed in claim 5 wherein said substituted fluorophosphazene is the compound

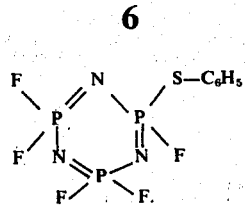

8. A process as claimed in claim 5 wherein said substituted fluorophosphazene is the compound

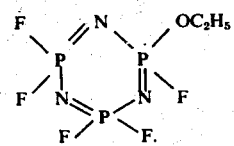

* * * * *